United States Patent
Videbæk

(10) Patent No.: US 12,536,609 B2
(45) Date of Patent: Jan. 27, 2026

(54) METHOD FOR STITCHING VIDEO RECORDINGS OF A SPORT EVENT

(71) Applicant: Veo Technologies ApS, København (DK)

(72) Inventor: Allan Erlang Videbæk, København (DK)

(73) Assignee: VEO TECHNOLOGIES APS, København (DK)

( * ) Notice: Subject to any disclaimer, the term of this patent is extended or adjusted under 35 U.S.C. 154(b) by 0 days.

(21) Appl. No.: 19/071,893

(22) Filed: Mar. 6, 2025

(65) Prior Publication Data

US 2025/0285210 A1 Sep. 11, 2025

(30) Foreign Application Priority Data

Mar. 8, 2024 (EP) ..................................... 24162361

(51) Int. Cl.

| | |
|---|---|
| *G06T 3/16* | (2024.01) |
| *G06T 3/4038* | (2024.01) |
| *G06T 7/33* | (2017.01) |
| *G06T 7/55* | (2017.01) |
| *G06T 7/73* | (2017.01) |
| *G06T 7/80* | (2017.01) |
| *H04N 23/90* | (2023.01) |

(52) U.S. Cl.
CPC .............. *G06T 3/16* (2024.01); *G06T 3/4038* (2013.01); *G06T 7/337* (2017.01); *G06T 7/55* (2017.01);
(Continued)

(58) Field of Classification Search
CPC ......... G06T 3/16; G06T 3/4038; G06T 7/337; G06T 7/55; G06T 7/74; G06T 7/80;
(Continued)

(56) References Cited

U.S. PATENT DOCUMENTS

2009/0022422 A1 1/2009 Sorek et al.
2011/0199372 A1* 8/2011 Porter .................... G06T 7/254
382/106

(Continued)

FOREIGN PATENT DOCUMENTS

EP 4006822 A1 6/2022

OTHER PUBLICATIONS

Farin, Dirk, "Ch. 13—Camera Calibration for the Analysis of Sport Videos", Ph.D. thesis, as early as Jan. 1, 2005, pp. 391-418.

(Continued)

*Primary Examiner* — Francis Geroleo
(74) *Attorney, Agent, or Firm* — Workman Nydegger

(57) ABSTRACT

The present disclosure relates to a method for stitching video recordings of a sport event. The method comprising the steps of: providing a first video recording and a second video; determining a first and second pluralities of feature points in the first and a second video recordings, wherein the first and second pluralities of feature points have a common set of feature points; identifying an element portion of a physical element present in at least one of the video recordings, wherein the element portion is associated with a physical size; estimating a feature location of feature points of the common set based on an in-frame position of the element portion in the video recordings and on the physical size of the element portion; and stitching the first video recording and the second video recording based on the feature location to obtain a panoramic video of the sport event.

20 Claims, 8 Drawing Sheets

Fig. 1

(52) U.S. Cl.
CPC ............... *G06T 7/74* (2017.01); *G06T 7/80* (2017.01); *G06T 2207/10016* (2013.01); *G06T 2207/20221* (2013.01); *G06T 2207/30228* (2013.01); *G06T 2207/30244* (2013.01); *H04N 23/90* (2023.01)

(58) Field of Classification Search
CPC . G06T 2207/10016; G06T 2207/20221; G06T 2207/30228; G06T 2207/30244; G06T 7/33; H04N 23/90
See application file for complete search history.

(56) References Cited

U.S. PATENT DOCUMENTS

| | | | |
|---|---|---|---|
| 2015/0154761 A1 | 6/2015 | Seitz et al. | |
| 2016/0050368 A1* | 2/2016 | Seo | G06T 7/194 348/36 |
| 2020/0020075 A1 | 1/2020 | Khwaja et al. | |
| 2020/0082149 A1 | 3/2020 | Niaf et al. | |
| 2021/0075958 A1* | 3/2021 | Vounckx | H04N 7/181 |
| 2022/0020168 A1 | 1/2022 | Price et al. | |

OTHER PUBLICATIONS

Lima, Felipe et al., "Artificial Neural Network Applied to Soccer Field Reconstruction", 2021 14th IEEE International Conference on Industry Applications (INDUSCON), Aug. 15, 2021, pp. 667-671.

Saegrov, Simen, "Bagadus: next generation sport analysis and multimedia platform using camera array and sensor networks", May 9, 2013, pp. 1-95.

European Search Report from Corresponding European Patent Application No. EP24162361, Apr. 30, 2024.

* cited by examiner

METHOD FOR STITCHING VIDEO RECORDINGS OF A SPORT EVENT

FIELD OF THE INVENTION

The present invention relates to a method for stitching video recordings of a sport event at a sport area. The invention further relates to a computer program for stitching video recordings of a sport event, and a system for recording a sport event.

BACKGROUND OF THE INVENTION

Professional sport events often enjoy the benefit of television broadcasting. However, this is typically not the case for amateur sport events due to the required costs and labor.

A challenge which generally has to be overcome is that a single camera does typically not sufficiently cover an entire sport area. As a result, either a camera must be panned and tilted to be directed towards a moving area of interest, or multiple cameras can be used from which a cropped or reduced view can be provided.

In recent years, dedicated sport camera assemblies for recording amateur sport events have grown in popularity, allowing amateur events and training sessions to be recorded, shared, and viewed by those having an interest. Such dedicated sport camera assemblies may for example have two image sensors which are directed at separate sub-sections of the sport area to thereby substantially cover the entire sport area. The videos recorded by the separate image sensors can then be merged, for example into a panoramic view, which can then be provided to a user in full or as a cropped view.

Even though such solutions significantly lower the threshold required for amateurs to record sport events and training sessions, the requirement of a dedicated sport camera assembly can nevertheless be a costly and cumbersome solution.

At present, mobile user devices having at least one camera, such as a smartphone, are becoming increasingly common and may thereby seem to offer a viable alternative to dedicated sport camera assemblies.

However, while videos recorded by sport camera assemblies having several image sensors provide fixed relative image sensor positioning and a fixed relative image sensor angle between the image sensors, videos recorded by several mobile user devices typically do not provide a pre-known relative positioning and angle between the cameras of the mobile user devices. This issue is enlarged by the use of different types of mobile user devices, and the use of mounts which do not provide a well-defined positioning and/or angle of the individual phones or their cameras.

As a result, two video recordings recorded by two separate mobile user devices cannot generally be smoothly stitched together to provide a panoramic video of a sport event of sufficient quality. Instead stitching of such video recordings will typically generate undesirable artefacts in the panoramic view, such a parallax errors. In particular, portions of video recordings which reproduce parts of the sport area which are located relatively close to cameras suffer from inaccurate stitching.

Hence, there is a demand for solutions which improve utilization of mobile user devices for recording sport events, and in particular for solutions which provide panoramic videos of high quality and reduced stitching artefacts.

SUMMARY OF THE INVENTION

On the above background, it is an object of preferred embodiments of the present disclosure to provide a solution which improves stitching of video recordings, in particular of video recordings from mobile user devices comprising separate cameras having fixed but typically unknown positioning and angling relative to each other.

A first aspect of the present disclosure relates to a computer-implemented method for stitching video recordings of a sport event, the method comprising the steps of:
  providing video recordings of a sport event at a sport area, the video recordings comprising a first video recording from a first video camera and a second video recording from a second video camera, wherein the video recordings are recorded while the first video camera and the second video camera have a fixed relative camera positioning and a fixed camera angle relative to each other and relative to the sport area;
  determining a first plurality of feature points in the first video recording and a second plurality of feature points in the second video recording, wherein the first plurality of feature points and the second plurality of feature points have a common set of feature points corresponding to feature points present in both the first video recording and the second video recording;
  identifying an element portion of a physical element present in at least one of the video recordings, wherein the element portion is associated with a physical size;
  estimating a feature location of one or more feature points of the common set, wherein the feature location is a representation of a physical location at the sport area relative to the first video camera and/or the second video camera, wherein the feature location is estimated based on an in-frame position of the element portion in one or more frames of the video recordings and on the physical size of the element portion; and
  stitching the first video recording and the second video recording based on the feature location to obtain a panoramic video of the sport event.

Aspects of the present disclosure have identified that particular conditions which are often provided by sport events at a sport area can be utilized to improve stitching. In more detail, a sport event at a sport area may often feature a physical element having an element portion associated with a physical size which can be used as a reference to improve stitching of the video recordings.

As an example, a sport event may be an association football match taking place at a football pitch. Here, a physical element can be a football goal, where a portion of the goal, such as a goal post or a crossbar, has a physical size which can be used as a reference to stich video recordings. Another example in relation to association football is the pitch itself, where the markings of the pitch can be used as reference. For example, the length of a boundary of the pitch (corresponding to a distance between corner flags) can be used, a size of a penalty area can be used, or a diameter of the center circle can be used.

Based on the position of the element portion and its size, the location of feature points in the videos can be estimated to obtain feature locations. Here, the estimated feature location is associated with a physical location at the sport area. For example, a feature location of a feature point may correspond to a particular spot on the sport area, such as a particular spot on a football pitch.

When the feature location of feature points of a common set of feature points of the video recordings have been estimated, this knowledge can be used to provide more accurate stitching of the video recordings. For example, an estimate of a feature location of feature points can improve the matching of these feature points used for stitching.

Further, based on an estimate of a feature location of feature points, the fixed relative camera positioning and the fixed camera angle at which the video recordings have been recorded can be estimated, and based on the estimated relative camera positioning and angling, an improved stitching can be implemented. In particular, the stitching of video recordings may be stitched in a manner which reduces stitching artefacts such as parallax errors.

As an example, an element portion of a physical element can be identified automatically, for example by machine vision configured to identify a specific element portion of a physical element such as a goal post of a physical goal. As another example, an element portion of a physical element can be identified based on manual input, for example a user inputs approximate positions of corners of a football pitch. The element portion of a physical element can also be identified based on a combination of manual input and automatic processing.

The physical size of the element portion is typically pre-programmed into a computer system performing the method. For example, a reference height of a goal post (from pitch to lower edge of crossbar) may be pre-programmed to 2.44 meters, or a length of the goal line (from one corner flag to another) may be pre-programmed to be 68 meters. However, the physical size may alternatively be based on manual input, or be configurable by manual input. For example, the length of a goal line may be pre-programmed to be 68 meters and this value can be changed by a user in case a football event takes place on a football pitch having unusual pitch dimensions.

Note that due to a variance of the size of physical elements such as football pitches, the size of an identified element portion is not necessarily identical to the (assumed) physical size used in the method. For example, a football pitch may have a goal line of 66 meters, while the method assumes a physical size of 68 meters. Nevertheless, even though the method according to the present disclosure might rely on physical sizes which are inaccurate, the method may still typically yield an improved stitch of video recordings. Relying on an approximated physical size of an element portion serves as an improvement in comparison to not using a physical size of an element portion at all.

The method according to the present disclosure typically relies on first and second video cameras having a fixed relative camera positioning and a fixed camera angle relative to each other and relative to the sport area. The fixed relative camera positioning and the fixed camera angle may typically be a result of the first camera being a first camera of a first mobile user device and the second camera being a second camera of a second mobile user device, wherein the first mobile user device and the second mobile user device are mounted in one or more mounts relative to the sport area. Here, mobile user devices The fixed relative camera positioning may be indicative of a distance between the first camera and the second camera along any of the three cartesian axes. The cameras further have a fixed camera angle relative to each other and relative to the sport area. For example, the cameras are directed at different portions of the sport area. Preferably, the first camera records at least one half of the sport area and the second camera records at least another half of the sport area, such that the first camera and the second camera collectively record an entirety of the sport area.

Examples of the present disclosure may utilize identification of several element portions of one or more physical elements present in at least one of the video recordings to further improve accuracy.

In the present disclosure, a mobile user device may typically be a smartphone, although other types of devices may also be used such as a tablet, a smartwatch, or another smart device such as smart head-wearable device.

The first and second video recordings may be provided by transmission from the cameras (or the mobile user devices hosting the cameras) to a computer system which then processes the video recordings. Recording and transmission may be performed based on a software application of the mobile user devices. The transmission may be performed via a wireless communication network such as a cellular telecommunications network which transfers the video recording to a remote processing system which then processes the video recordings.

Any conventional approach for determining feature points may be used to determine the first plurality of feature points and the second plurality of feature points. One example is to use a scale-invariant feature transform algorithm, which are also typically capable of identifying a common set of feature points corresponding to feature points present in both the first video recording and the second video recording. Other algorithms or approaches such as speeded up robust features, gradient location and orientation histogram, or histogram of oriented gradients may also be used.

Examples of sport events at a sport area of relevance to the present disclosure are an association football event at an association football pitch, an American football event at an American football field, a handball event at a handball court, a rugby event at a rugby pitch, a basketball event at a basketball court, and a lacrosse event at a lacrosse field. An event can be a match event or a training event. These examples are non-exhaustive.

Since the present disclosure typically relies on stitching of video recordings in which a common set of feature points is present, the aspects disclosed herein are primarily relevant for video recordings in which a field of view of the first video recording overlaps/intersects a field of view of the second video recording.

According to examples of the present disclosure, the first video camera is a camera of a first mobile user device and the second video camera is a camera of a second mobile user device.

According to examples of the present disclosure, the first video camera and the second video camera are different.

The utilization of identification of an element portion of a physical element provides a reference in the video recordings, which in turn may improve stitching of video recordings from different types of video cameras.

According to examples of the present disclosure, the method comprises a step of fixating the first video camera and the second video camera relative to each other, wherein the step of fixating the first video camera and the second video camera comprises releasably attaching each of the first video camera and the second video camera onto one or more camera mounts, wherein the step of fixating the first video camera and the second video camera is performed prior to the step of providing the video recordings.

According to examples of the present disclosure, the step of fixating the first video camera and the second video camera provides the fixed relative camera positioning and the fixed camera angle, wherein the one or more camera mounts releasably attaches the first video camera and the second video camera such that the fixed relative camera positioning is unknown and/or such that the fixed camera angle is unknown.

The utilization of identification of an element portion of a physical element can ensure that it is not necessary to rely exact information on the fixed relative camera positioning and the fixed camera angle to accurately perform the stitch. In examples, such information can be derived based on processing of the video recordings.

According to examples of the present disclosure, the method comprises a step of releasing the first video camera and the second video camera from the one or more camera mounts subsequent to recording the video recordings.

That is, in examples, mobile user devices which are releasably fixated during recording is used, in contrast to relying on, e.g., image sensors immovably fixed to a sport camera assembly.

According to examples of the present disclosure, the physical element has a fixed location relative to the sport area.

Thereby, position and physical size of the physical element and the element portion can be more accurately used to estimate feature locations.

Examples of physical elements having a fixed location relative to the sport area are the sport area itself and a physical goal at the sport area used for the sport event.

According to examples of the present disclosure, the feature location is estimated based on a relative element location of the physical element relative to the sport area.

Thereby, position and physical size of the physical element and the element portion can be more accurately used to estimate feature locations.

For example, if the element portion is a goal line, the feature location of feature points can be determined relative to the position of the goal line.

According to examples of the present disclosure, the relative element location is provided based on an assumed location of the physical element relative to the sport area.

For example, a physical goal (or a portion of a sport area) may be assumed to have a certain position relative to the sport area, upon which the feature location of feature points can be estimated.

According to examples of the present disclosure, the method comprises a step of determining a camera positioning estimate indicative of the fixed relative camera positioning, wherein the camera positioning estimate is estimated based on a comparison of the one or more feature points of the common set in the first video recording with the one or more feature points of the common set in the second video recording,
    wherein the step of stitching the first video recording and the second video recording is based on the camera spacing estimate.

If the fixed relative camera positioning is known, the video recordings can be stitched more accurately. However, often, the fixed relative camera positioning is not known.

In particular, stitching of portions of video recordings which contain parts of the sport area which are located relatively close to cameras may be improved based on a known relative camera positioning.

Thereby, examples of the present disclosure determine a camera positioning estimate indicative of the fixed relative camera positioning. Since the relative camera positioning affects the perceived feature location, the camera positioning estimate is estimated based on a comparison of feature points in the two video recordings. Finally, the camera positioning estimate can be inputted into an image stitching algorithm. For example, a conventional image stitching algorithm which accepts a relative camera positioning as an input can be used. For example, a homography-based stitching algorithm or a panoramic stereographic stitching algorithm can be used.

As an example, different trial camera positioning estimates may be applied to provide various trail comparisons of feature points, trial comparisons of feature locations, or trail comparison of the video recordings, and the trial camera positioning estimate which provides the best comparison is then selected to provide a final stitching of the first video recording and the second video recording.

According to examples of the present disclosure, the method comprises a step of mapping at least one of the video recordings to a digital area model of the sport area such that the digital area model represents the sport area,
    wherein the mapping of the at least one of the video recordings to the digital area model provides a mapping of the feature location of the one or more feature points of the common set to the digital area model,
    wherein the step of stitching the first video recording and the second video recording is based on the mapping of the feature location to the digital area model.

One approach to relate the element portion and its physical size to the feature points is to hap the video recordings to a digital area model of the sport area. For example, based on positioning and distance of corners of a sport area, of positioning and distance of physical goals, the first video recording and/or the second video recording may be mapped to a digital area model.

In an example, at least one of the video recordings is mapped to a digital area model of the sport area such that for a portion of the at least one of the video recordings each pixel corresponds to a specific position on the digital area model.

Such a digital area model may assume specific dimensions of a sport area. The assumed dimensions of a sport area do generally not need to be identical to the actual dimensions of the sport area to nevertheless provide improved stitching.

According to examples of the present disclosure, the step of stitching the first video recording and the second video recording is based on a comparison of the mapping of the feature location of feature points of the first video recording and the mapping of the feature location of feature points of the second video recording.

According to examples of the present disclosure, the comparison of the mapping of the feature location involves determining a distance between the mapping of the feature location of feature points of the first video recording and the mapping of the feature location of feature points of the second video recording.

According to examples of the present disclosure, the step of stitching the first video recording and the second video recording is based on reducing the distance between the mapping of the feature location of feature points of the first video recording and the mapping of the feature location of feature points of the second video recording to thereby determine the camera positioning estimate.

As an example, different trial camera positioning estimates may be applied to provide different trial distances, and the trial camera positioning estimate which provides the lowest distance is then selected to provide a final stitching of the first video recording and the second video recording.

According to examples of the present disclosure, the step of mapping at least one of the video recordings to the digital area model is based on the step of identifying the element portion.

According to examples of the present disclosure, the step of mapping at least one of the video recordings to the digital area model is based on the relative element location and/or the physical size of the element portion.

According to examples of the present disclosure, a physical camera location of the first video camera and/or the second video camera relative to the sport area is determined based on the step of identifying the element portion, wherein the step of stitching the first video recording and the second video recording is based on the camera location.

According to examples of the present disclosure, the camera location is determined based on the mapping of the at least one of the video recordings to the digital area model.

If the physical camera location relative to the sport area is known is known, the video recordings can be stitched more accurately. However, often, the physical camera location is not known.

In particular, stitching of portions of video recordings which contain parts of the sport area which are located relatively close to cameras may be improved based on a known physical camera location.

Hence, examples of the present disclosure estimate physical camera location. Since the physical camera location affects the perceived feature location, the camera location may for example be estimated based on the feature location. Alternatively or additionally, the physical camera location may be based on the mapping of the video recordings to the digital area model.

Finally, the physical camera location can be inputted into an image stitching algorithm. For example, a conventional image stitching algorithm which accepts a relative camera positioning as an input can be used.

According to examples of the present disclosure, the step of stitching comprises matching the one or more feature points of the common set in the first video recording with the one or more feature points of the common set in the second video recording to thereby provide an alignment of the first video recording and the second video recording.

According to examples of the present disclosure, the method comprises a step of determining a relative scaling factor indicative of relative scaling between the first video recording and the second video recording, wherein the step of stitching the first video recording and the second video recording is based on the relative scaling factor.

A relative scaling between the video recordings may for example be relevant if different cameras are used and/or if the fixed relative camera positioning is relatively large, i.e., the cameras are spaced far apart. The scaling factor may scale one video recording relative to the other video recording.

According to examples of the present disclosure, the step of stitching the first video recording and the second video recording is based on one or more intrinsic camera parameters and/or distortion parameters of the first video camera and/or the second video camera.

This can in particular be relevant if different cameras are used. Distortion parameters may, for example, indicate distortion be a lens of a camera.

According to examples of the present disclosure, the step of stitching the first video recording and the second video recording is based on a camera angle estimate, wherein the camera angle estimate is indicative of the fixed camera angle.

As an example, the camera angle estimate can be provided based on, e.g., the geometry of a common camera mount, or based on analysis of the video recordings, for example of the common feature points.

According to examples of the present disclosure, the method comprises a step of determining the camera angle estimate, wherein the camera angle estimate is determined based on a comparison of the one or more feature points of the common set in the first video recording with the one or more feature points of the common set in the second video recording.

According to examples of the present disclosure, the camera angle estimate is determined based on a comparison of the mapping of the feature location of feature points of the first video recording and the mapping of the feature location of feature points of the second video recording.

According to examples of the present disclosure, the one or more feature points of the common set comprises at least a first feature point and a second feature point, wherein the feature location of the first feature point and the feature location of the second feature point are located at different distances relative to the first camera and/or the second camera.

By determining feature locations, the method according to the present disclosure is particularly advantageous to process feature points located at different distances relative to the first camera and/or the second camera.

According to examples of the present disclosure, the one or more feature points are weighted based on a distance of the feature location relative to the first camera and/or the second camera such that one feature point having a greater distance than another feature point has a greater relative weight when determining the camera angle estimate and/or a lesser relative weight when determining the camera positioning estimate.

Feature points which are far away from the cameras are advantageous to use for determining the camera angle estimate, i.e., the relative angle between the cameras, and feature points which are closer to the cameras are advantageous to use for determining the camera positioning estimate, for example how far apart the cameras are spaced.

Thereby, by utilizing different relative weights, stitching may be improved. A relative weight may be zero, i.e., some feature points are ignored while determining the camera angle estimate and/or some (other) feature points are ignored while determining the camera positioning estimate.

According to examples of the present disclosure, a common sub-area of the first video recording and the second video recording has a digital center reference line located centrally in the common sub-area and oriented with a direction away from the first video camera and the second video camera, wherein the one or more feature points are weighted based on a distance of the feature location relative to the center reference line such that one feature point having a greater distance than another feature point has a lesser relative weight when stitching the first video recording and the second video recording.

Hence, feature points closer to the center of the common sub-area may have a greater weight in comparison with feature points away from the center of the common sub-area.

According to examples of the present disclosure, the physical element is a sport-related element, for example a physical goal or the sport area.

An element portion of sport area may be a part of a field, a pitch, or a court of the sport, for example a one or more corners, one or more spot markings, or one or more line markings of the field, the pitch, or the court.

A physical goal may for example be a football/soccer goal, an American football goal, a handball goal, a rugby goal, a basketball basket (or a basketball backplate), or a lacrosse goal. An element portion of a physical goal may for example be a height or a width of the goal.

According to examples of the present disclosure, the step of providing video recordings comprises the sub-steps of:

fixating a first mobile user device and a second mobile user device relative to each other and relative to the sport area, wherein the first mobile user device comprises the first video camera and is configured to initiate recording of the first video recording upon receiving an incoming initiation signal, wherein the second mobile user device comprises the second video camera and is configured to initiate recording of the second video recording upon receiving an incoming initiation signal;

providing a third mobile user device configured to transmit the initiation signal; and transmitting the initiation signal from the third mobile user device to the first mobile user device and to the second mobile user device to thereby initiate recording of the first video recording and of the second video recording.

According to examples of the present disclosure, the initiation signal is transmitted to the first mobile user device and the second mobile user device simultaneously to thereby initiate recording of the first video recording and of the second video recording simultaneously, the step of stitching the first video recording and the second video recording is performed based on the first video recording and the second video recording being initiated simultaneously.

Thus, examples of the present disclosure utilize the concept of recording a sport event using two separate mobile user devices controlled by a third mobile user device.

This procedure may facilitate a simple approach providing a panoramic video in which the video recordings are at least approximately temporally synchronized. Further, this procedure allows a user to be out of reach of the two mobile user devices which actually record the sport event. This is particularly advantageous in the context of recording sport events, in which it is often desirable to provide video recordings from a point of view which is elevated relative to the sport area to thereby provide a proper overview of the event.

The concept may for example be implemented via software applications (i.e., 'apps') installed on the relevant mobile user devices.

By both initiating video recordings by a third mobile user device and stitching the video recordings based on a feature location, a simply yet high-quality approach to generating a panoramic view of a sport event by means of mobile user devices is provided.

A second aspect of the present disclosure relates to a computer program for stitching video recordings of a sport event, the computer program comprising digital instructions which, when the computer program is executed by a computer processing system, cause the computer processing system to:

receive video recordings of a sport event at a sport area, the video recordings comprising a first video recording from a first video camera and a second video recording from a second video camera, wherein the video recordings are recorded while the first video camera and the second video camera have a fixed relative camera positioning and a fixed camera angle relative to each other and relative to the sport area;

determine a first plurality of feature points in the first video recording and a second plurality of feature points in the second video recording, wherein the first plurality of feature points and the second plurality of feature points have a common set of feature points corresponding to feature points present in both the first video recording and the second video recording;

identify an element portion of a physical element present in at least one of the video recordings, wherein the element portion is associated with a physical size;

estimate a feature location of one or more feature points of the common set, wherein the feature location is a representation of a physical location at the sport area relative to the first video camera and/or the second video camera, wherein the feature location is estimated based on an in-frame position of the element portion in one or more frames of the video recordings and on the physical size of the element portion; and stich the first video recording and the second video recording based on the feature location to obtain a panoramic video of the sport event.

According to examples of the present disclosure, the digital instructions, when the software application is executed by the computer processing system, cause the computer processing system to perform the method according to any of the examples of the first aspect of the present disclosure.

Generally, examples of the second aspect of the present disclosure may have advantages and implications similar to examples of the first aspect of the present disclosure.

The computer program may be implemented on a remote processing system, the processing system being remote relative to the video cameras which have recorded the videos. Such a remote processing system may for example be based on one or more servers connected to the internet.

A third aspect of the present disclosure relates to a system for recording a sport event, the system comprising:

a sport area for hosting the sport event;

a first video camera located at the sport area for recording the sport event to provide a first video recording;

a second video camera located at the sport area for recording the sport event to provide a second video recording, wherein the first video camera and the second video camera have a fixed relative camera positioning and a fixed camera angle relative to each other and relative to the sport area;

a computer processing system communicatively linked to the first video camera and the second video camera, wherein the computer processing system is configured to:

receive video recordings of the sport event at the sport area, the video recordings comprising the first video recording from the first video camera and the second video recording from the second video camera;

determine a first plurality of feature points in the first video recording and a second plurality of feature points in the second video recording, wherein the first plurality of feature points and the second plurality of feature points have a common set of feature points corresponding to feature points present in both the first video recording and the second video recording;

identify an element portion of a physical element present in at least one of the video recordings, wherein the element portion is associated with a physical size;

estimate a feature location of one or more feature points of the common set, wherein the feature location is a representation of a physical location at the sport area relative to the first video camera and/or the second video camera, wherein the feature location is estimated based on an in-frame position of the element portion in one or more frames of the video recordings and on the physical size of the element portion; and stich the first video recording and the second video recording based on the feature point distance to obtain a panoramic video of the sport event.

According to examples of the present disclosure, the computer processing system is configured to perform the method according to any of the examples of the first aspect of the present disclosure.

Generally, examples of the third aspect of the present disclosure may have advantages and implications similar to examples of the first aspect of the present disclosure.

BRIEF DESCRIPTION OF THE DRAWINGS

Embodiments of the invention will now be further described by reference to the accompanying drawings, in which.

DETAILED DESCRIPTION

Figure 1:
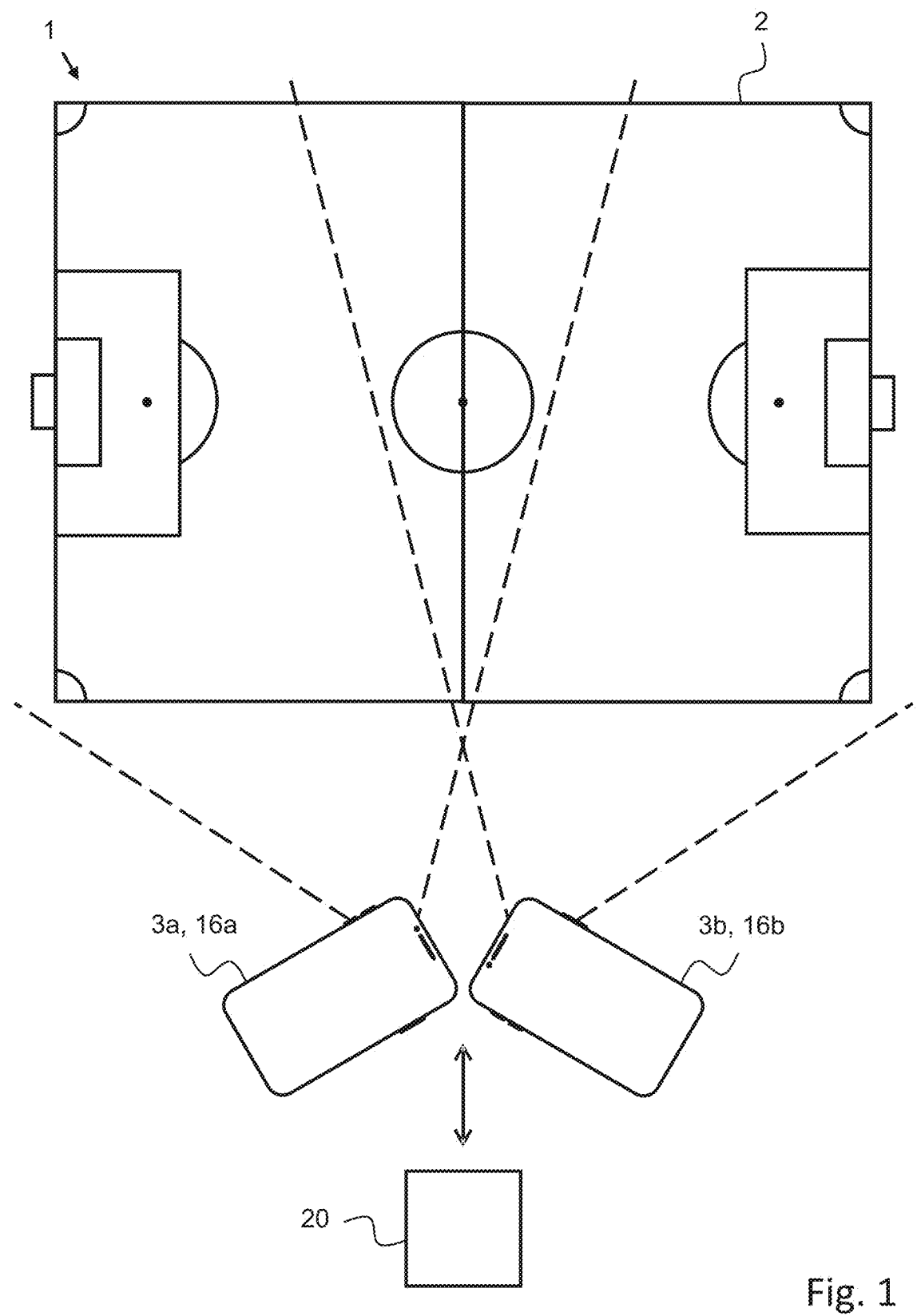
FIG. 1 illustrates a recording system for recording a sport event according to examples of the present disclosure.

FIG. 1 illustrates a recording system 1 for recording a sport event according to examples of the present disclosure.

The recording system 1 comprises a sport area 2 for hosting the sport event. In this particular example, the sport area 2 is illustrated to be an association football pitch.

The recording system 1 additionally comprises a first mobile user device 3a, which in turn comprises a first video camera 16a. The first mobile user device 3a and the first video camera 16a are located at the sport area 2 for recording the sport event at the sport area 2 to thereby provide a first video recording.

Further, the recording system 1 comprises a second mobile user device 3b, which in turn comprises a second video camera 16b. The second mobile user device 3b and the second video camera 16b are also located at the sport area 2 for recording the sport event at the sport area 2 to thereby provide a second video recording.

The illustration provides an indication of the physical extent of the regions of the sport area 2 which are captured in the respective video recordings of the cameras 16a, 16b via dashed lines extending from the mobile user devices 3a, 3b and video cameras 16a, 16b.

Finally, the recording system 1 comprises a remote computer processing system 20 configured to process the first video recording of the first video camera 16a and the second video recording of the second video camera 16b.

The processing of these video recordings is detailed in relation other figures of the present disclosure.

The video recordings may be transmitted from the first mobile user device 16a and the second mobile user device 16b to the computer processing system 20 via a telecommunications network. The computer processing system may comprise a digital storage for storing, e.g. video recordings, a computer program for processing the video recordings, and the stitched panoramic video. The computer processing system may further comprise a processing unit for processing the video recordings according to the computer program.

Figure 2A:
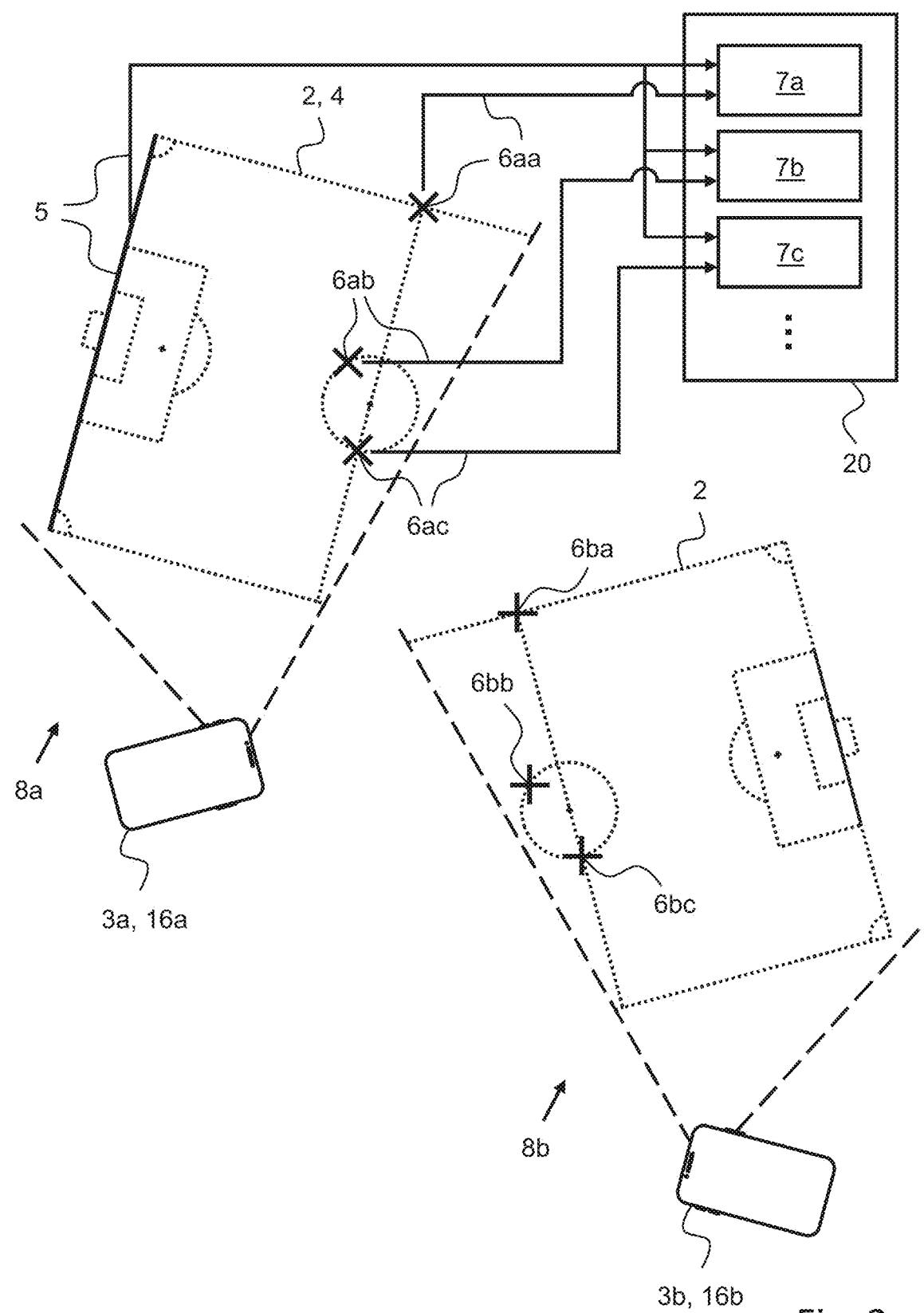
FIG. 2a-b illustrate a method of stitching video recordings of a sport event according to an example of the present disclosure.
Figure 2B:
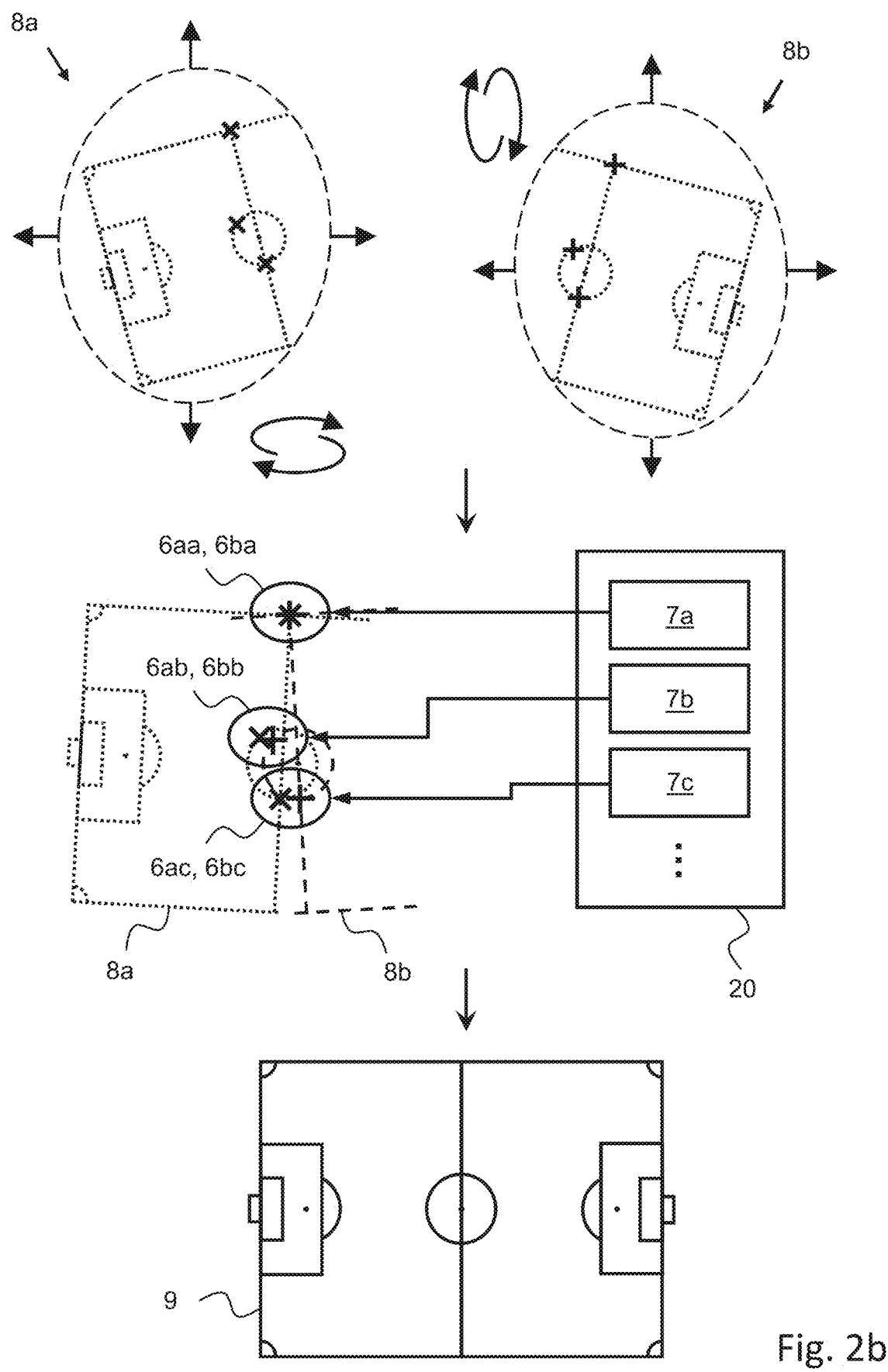

FIG. 2a-b illustrate a method of stitching video recordings 8a, 8b of a sport event according to an example of the present disclosure.

FIG. 2a provides a schematic illustration of two video recordings 8a, 8b of a sport event having been recorded by video cameras 16a, 16b of mobile user devices 3a, 3b and determination of feature points 6aa-6bc and of feature locations 7a-7c.

A first video camera 16a has recorded a first video recording 8a, and a second video camera 16b has provided a second video recording 8b. These video recordings may for example be provided in a recording system as illustrated in FIG. 1.

The illustration provides an indication of the physical extent of the regions of the sport area 2 which have been captured in the respective video recordings 8a, 8b via dashed lines extending from the video cameras 16a, 16b.

In the first video recording 8a, a first portion of the sport area 2 is captured, and in the second video recording 8b, a second portion of the sport area 2 is captured. The first portion and the second portion intersect and collectively cover an entirety of the sport area 2.

A first plurality of feature points 6aa, 6ab, 6ac is determined in the first video recording 8a and a second plurality of feature points 6ba, 6bb, 6bc is determined in the second video recording 8b. The first plurality of feature points 6aa, 6ab, 6ac and the second plurality of feature points 6ba, 6bb, 6bc have a common set of feature points corresponding to feature points present in both the first video recording 8a and the second video recording 8b. In the illustrated example, a first feature point 6aa of the first plurality of feature points is located in the first video recording 8a at the point where the half-way line of the football pitch intersects the touch line transverse to the half-way line. Similarly, a first feature point 6ba of the second plurality of feature points is also located in the second video recording 8b at the point where the half-way line intersects the touch line. Hence, these feature points 6aa, 6ba are part of a common set corresponding to feature points present in both video recordings 8a, 8b. In the present illustration, all the exemplary feature points 6aa-6bc are part of such a common set.

The feature points 6aa-6bc and their pairing across the two video recordings 8a, 8b are determined using a scale-invariant feature transform algorithm.

As part of the processing of the video recordings 8a, 8b, an element portion 5 of a physical element 4 present in the first video recording 8a is identified. In the present example, the sport area 2 constitutes the relevant physical element 4, and the goal line constitutes the element portion 5. This goal line 5 has an assumed length of, for example, 66 meters.

By using the position of the goal line 5 in a frame of the first video recording 8a and its physical size, a physical location of at least the first plurality of feature points 6aa-6ac can be estimated, thereby providing feature locations 7a-7c of the feature points of the common set. For example, considering the first feature point 6aa at the intersection between the half-way line and the touch line, the method can now infer a physical location to this feature point. Prior to estimating the feature location 7a, this feature point 6aa had merely been determined based on a local signature of a frame of a video recording, for example based on image gradient information. Hence, the relation of the feature point 7a to the actual sport area was not known. This relation can then be established based on using the goal line 5 as reference, thereby establishing feature locations 7a-7c of the feature points 6aa-6ac.

FIG. 2b provides a schematic illustration of stitching the two video recordings 8a, 8b to provide a panoramic video 9 of the sport event.

After determining feature points and feature locations as described in relation to FIG. 2a, the video recordings 8a, 8b are stitched.

The video recordings 8a, 8b may generally be stretched, rotated, and scaled to provide alignment. Such operations are indicated in the top portion of FIG. 2b by arrows. Generally, typical alignment procedures seek to align the first plurality of feature points 6aa-6ac of the first video recording 8a and the second plurality of feature points 6ba-6bc of the second video recording 8b, for example by minimizing the distance between the first plurality of feature points and the second plurality of feature points in the resulting panoramic video 9.

However, due to a large parameter space of this alignment procedure, a simple minimization of distance between feature points does not necessarily yield a satisfactory alignment.

Therefore, the feature location 7a-7c of the feature points is used as an input for the alignment procedure. This may for example ensure that the operations applied to the video recordings 8a, 8b to align these do not distort the video recordings 8a, 8b in a manner which compromises the distribution of feature locations artificially such that these do not properly represent the physical locations which the feature locations represent.

When the first video recording 8a and the second video 8b recording have been properly aligned, they are stitched to provide a panoramic video 9 of the sport event as indicated in the lower portion of FIG. 2b. The stitching may be performed by blending or seaming the video recordings 8a, 8b.

FIG. 3a-h illustrate a method of stitching video recordings of a sport event according to another example of the present disclosure. Some of the images are provided as zoomed-in view to provide a better view of, e.g., feature points.

In this particular example, video recordings are stitched by mapping video recordings to a digital area model 10 of the sport area.

Figure 3A:
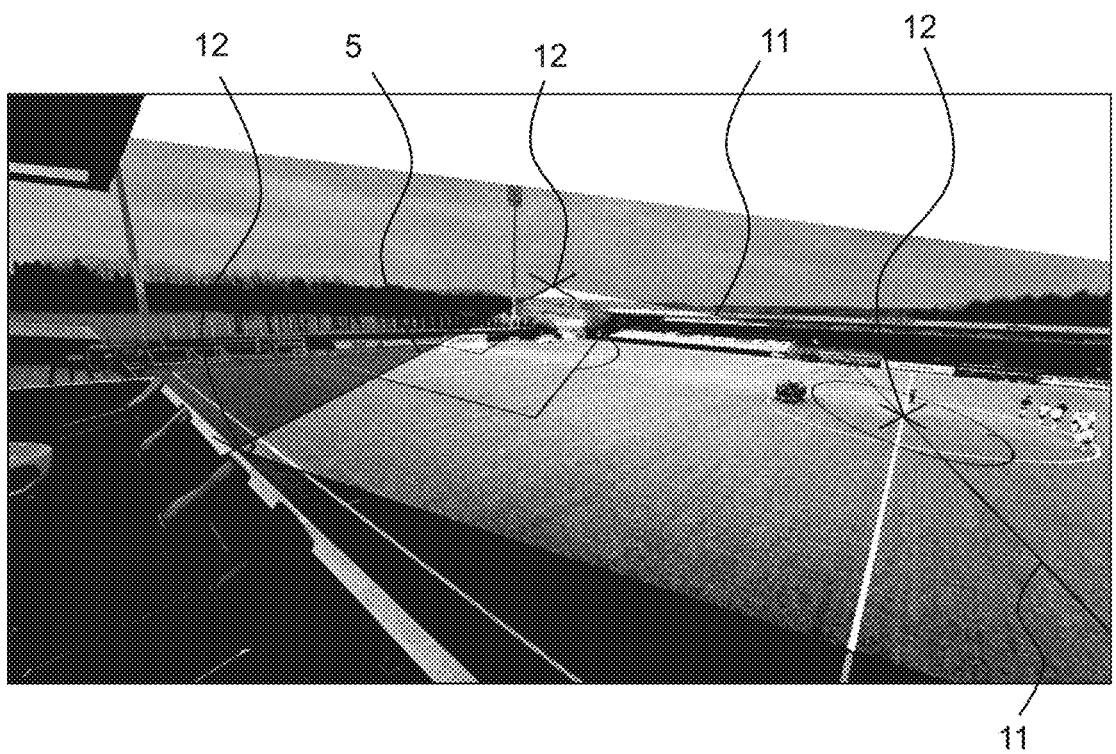
FIG. 3a-h illustrate a method of stitching video recordings of a sport event according to another example of the present disclosure.

FIG. 3a illustrates a frame of a first video recording which has been inaccurately mapped to a digital area model 11. Regions of the frame outside the digital area model 11 have been artificially darkened to highlight the digital area model.

The figure illustrates two corners and a center of the digital area model 11. These constitute element reference points 12, i.e., reference points indicative of an element portion of a physical element. In the present example, these element reference points 12 are to be aligned with the corners and center of the football pitch. Therethrough, portions (the goal line 5 and the center) of the football pitch have to be identified to thereby align the digital area model 11 with the video recording. Further, the distances between these element reference points 12 are associated with at least one physical size, i.e., the length of the goal line 5.

Figure 3B:
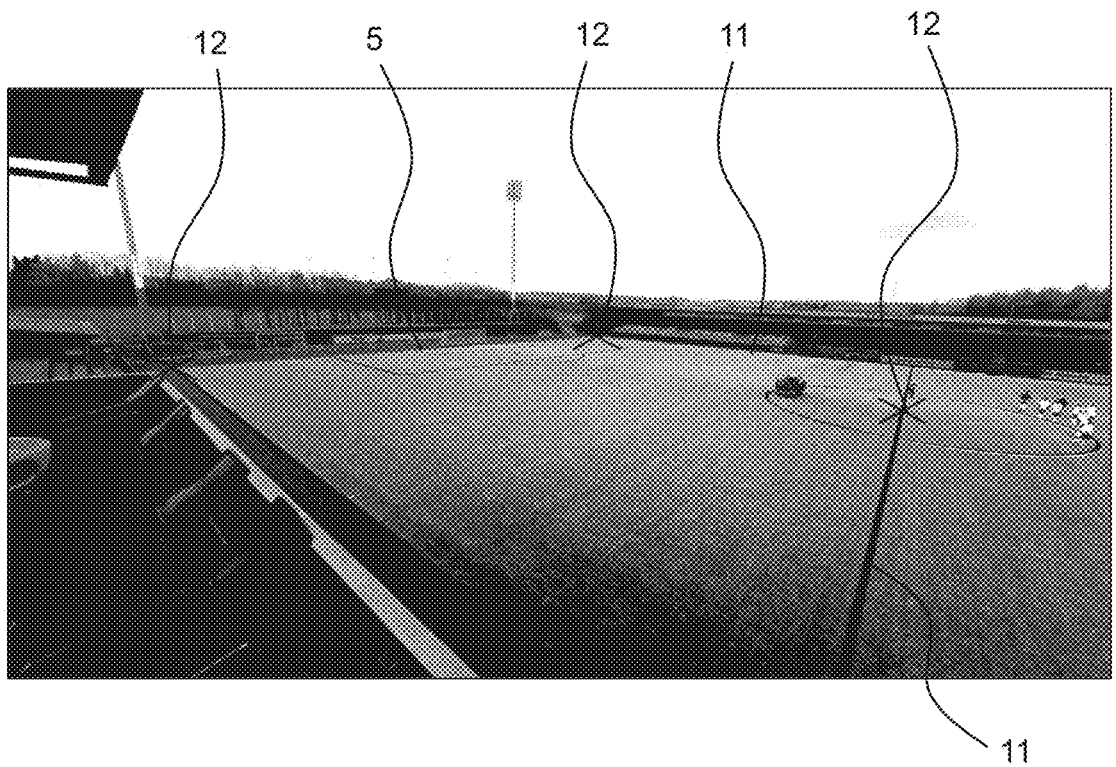

FIG. 3b illustrates, the same frame of a video recording as FIG. 3a, but the goal line 5 and the center has been correctly identified, and the digital area model 11 is aligned with the football pitch of the video recording.

Figure 3C:
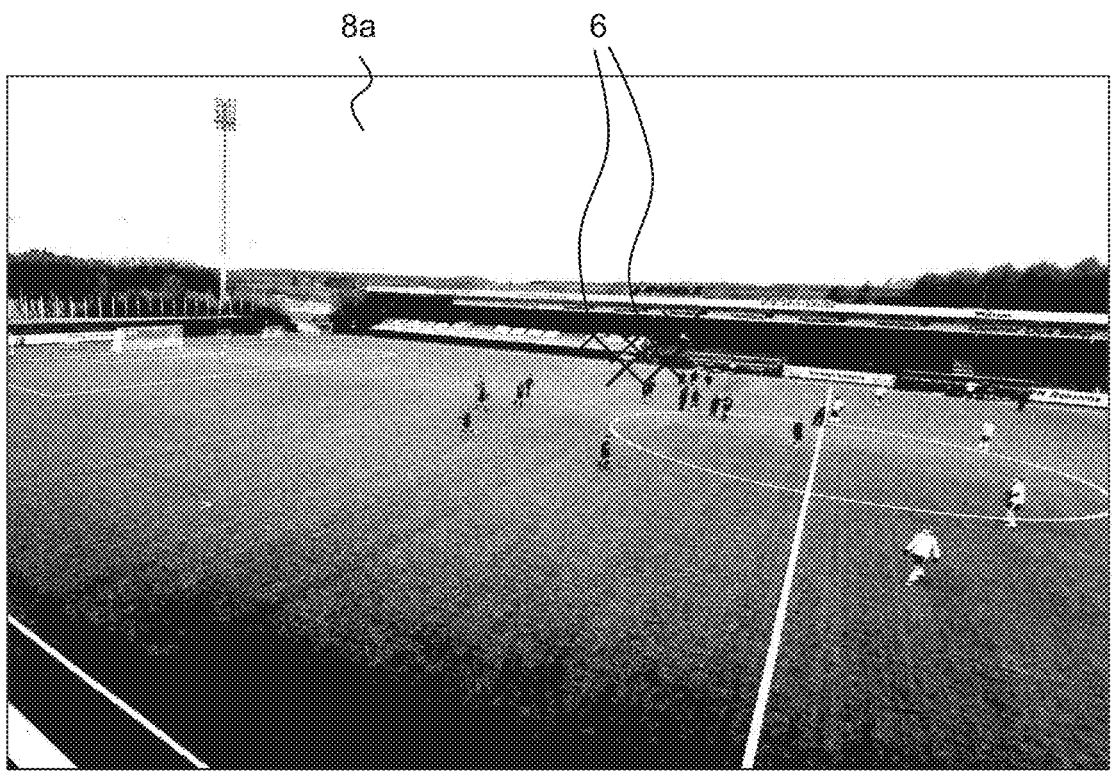
Figure 3D:
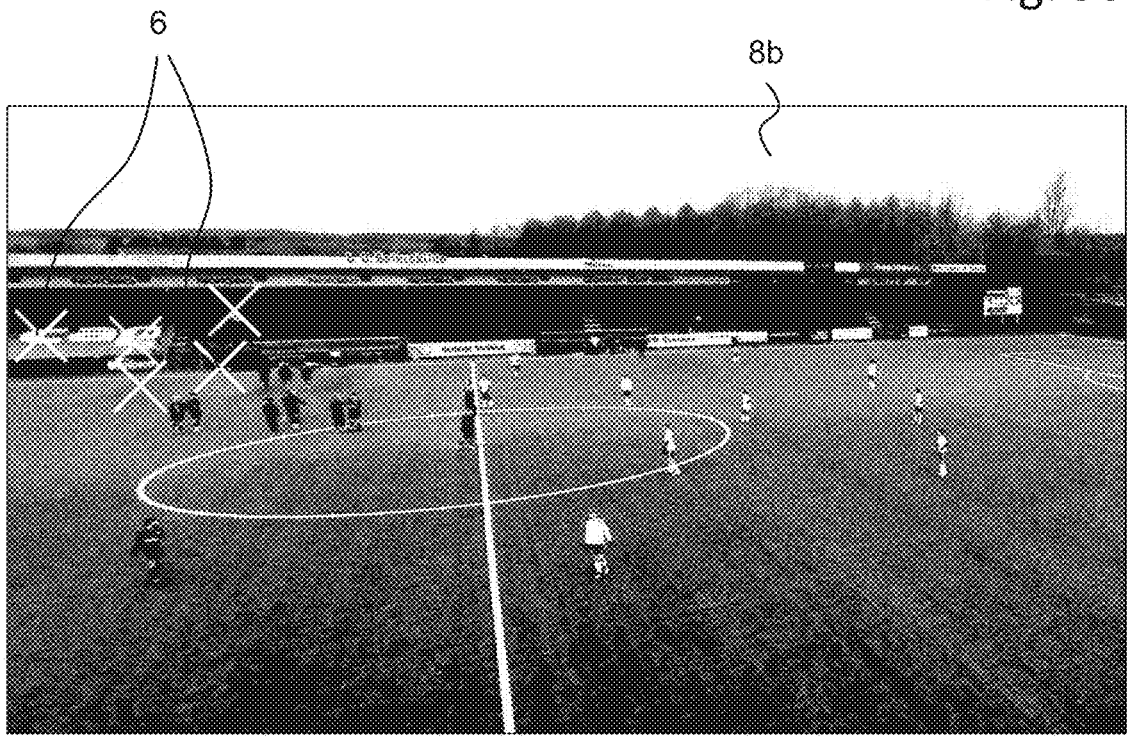

FIGS. 3c and 3d correspond to frames of a first video recording and a second video recording, respectively, in which a first group of feature points 6 have been determined. This first group of feature points is used to perform a tentative alignment of the video recordings. Later in the procedure, a second group of feature points is used to perform a final alignment to thereby provide a panoramic view. The difference between the first group of feature points and the second group of feature points is that the first group of feature points relate to feature points which correspond to physical locations which are distant relative to the cameras which have captured the video recordings, and the second group of feature points relate to feature points which correspond to physical locations which are closer relative to the cameras. In practice, in this particular example, feature points which are beyond the perimeter of the football pitch are grouped into the first group, and feature points are within the distant touch line are grouped into the second group. The feature points in the first group and in the second group are then weighted differently when processing and stitching the video recordings. Namely, the first group of feature points are used to provide a camera angle estimate indicative of the fixed camera angle, and the second group of feature points are used to determine a camera positioning estimate indicative of the fixed relative camera positioning. Note here that feature points may relate to objects and elements which are far beyond the perimeter of, e.g., a football pitch. For example, feature points may relate to clouds visible in the sky. Thus, feature points are typically not limited by a perimeter of the sport area, but may simply have some kind of relative position within the sport area, or relative to the sport area.

Note further that feature points may have a weight of 0. As an example, only the first group of feature points are used to provide a camera angle estimate (because the second group has a weight of 0 when determining a camera angle estimate), and only the second group of feature points are used to provide a camera positioning estimate (because to first group has a weight of 0 when determining a camera positioning estimate). Thereby, these differently weighted points are treated differently in practice.

Figure 3E:
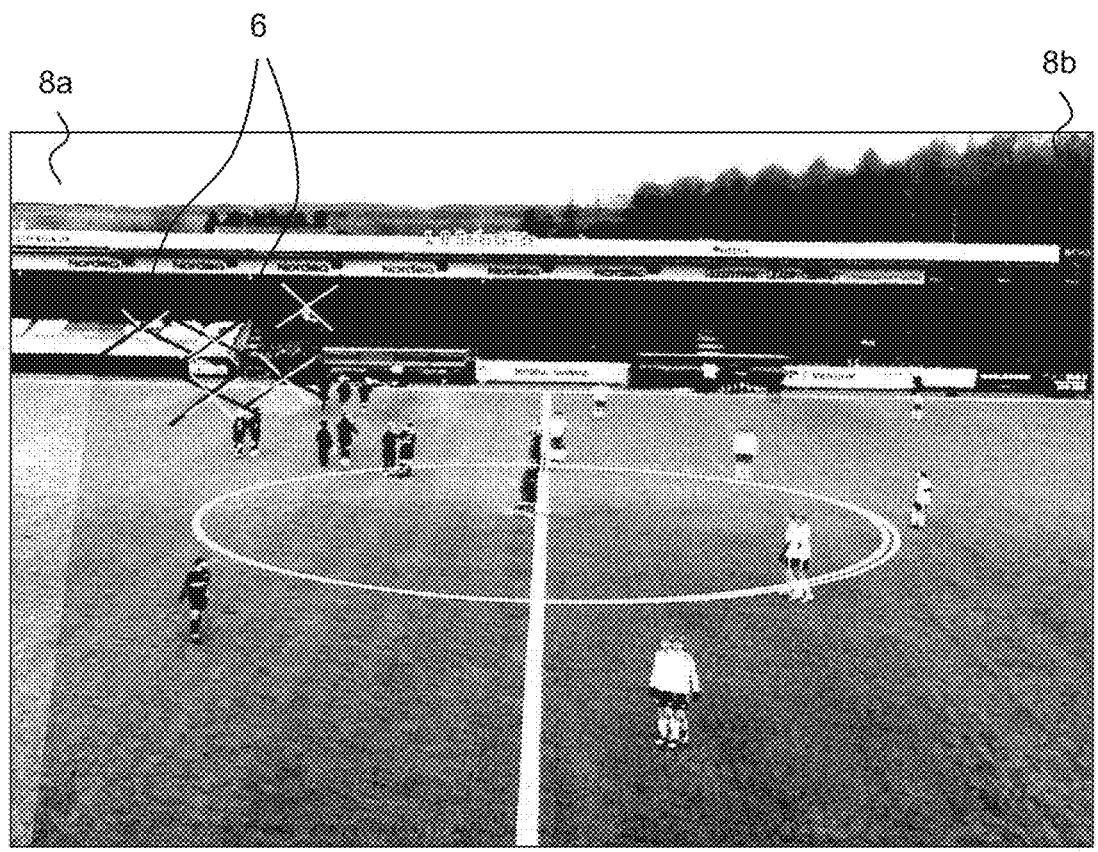

In FIG. 3e, the frames of the first and second video recordings 8a, 8b have been tentatively aligned to provide a tentative panoramic video. This alignment is based on providing a camera angle estimate, which in turn is based on the first group of feature points 6 also illustrated in FIG. 3e. As a result, the feature points illustrated in FIG. 3c and the feature points illustrated in FIG. 3d are aligned in the tentative panoramic view of FIG. 3e.

Figure 3F:
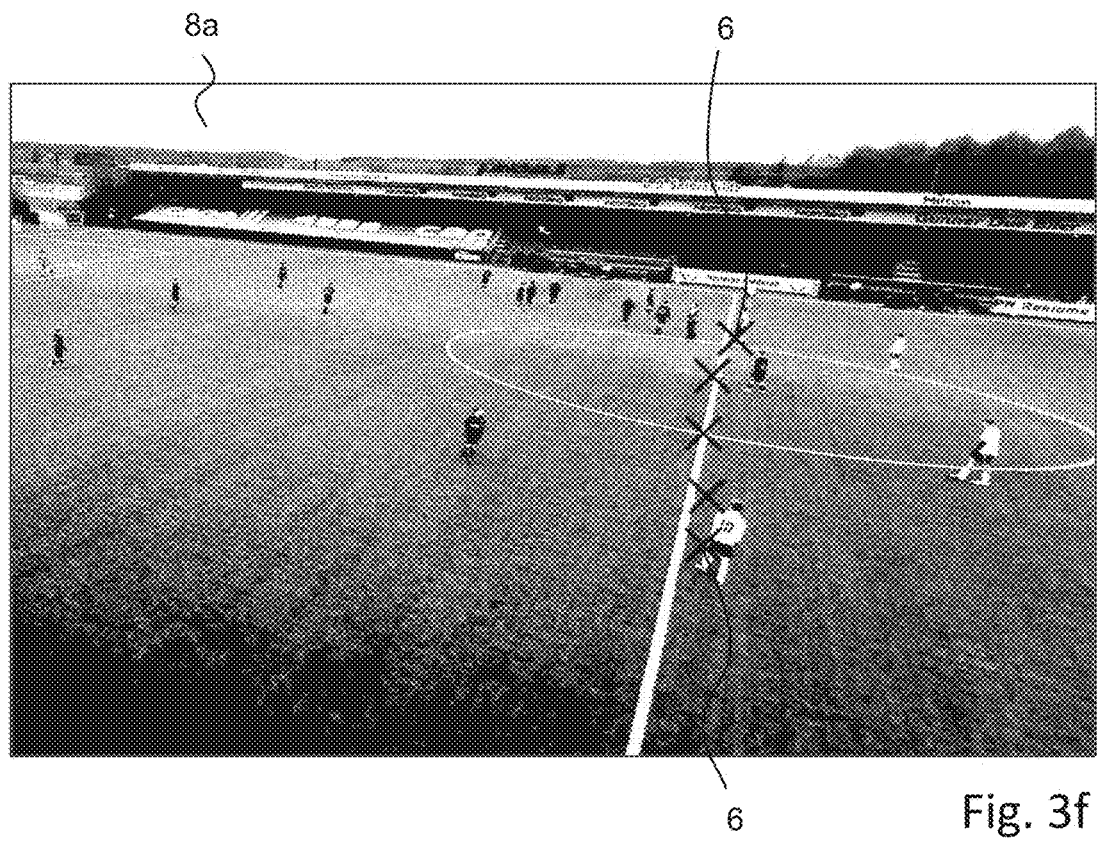
Figure 3G:
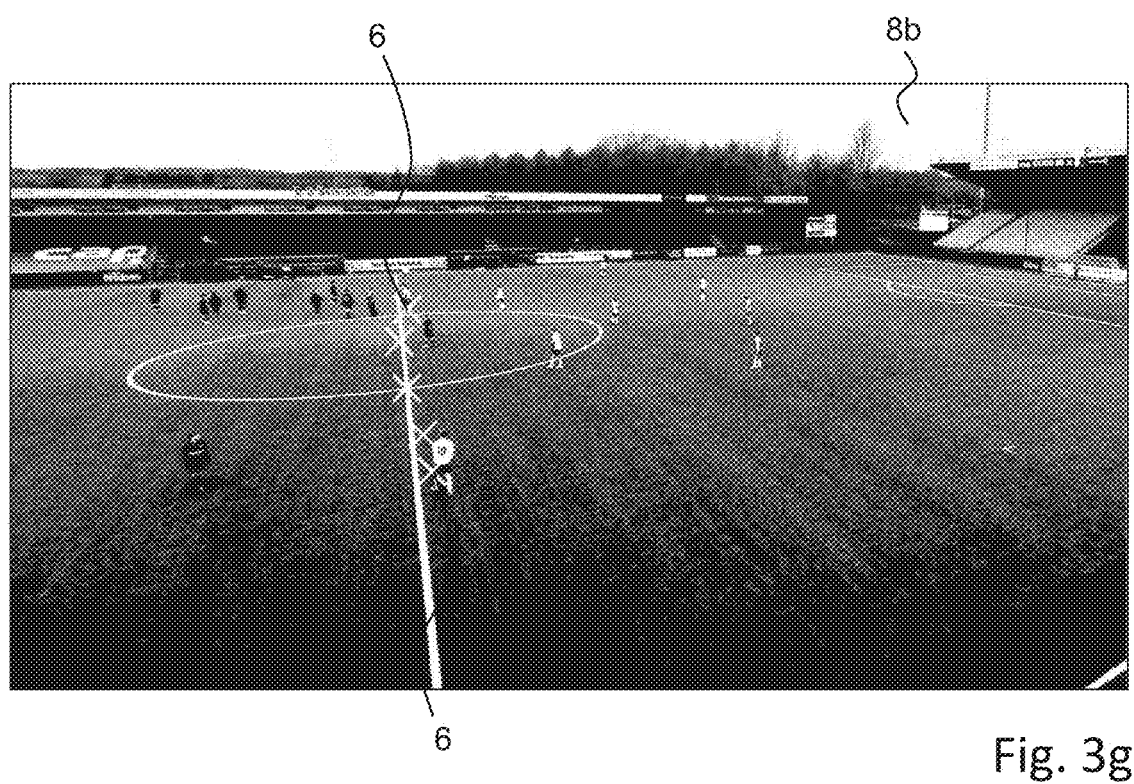

FIGS. 3f and 3g correspond to frames of the first video recording and the second video recording, respectively, in which a second group of feature points 6 have been determined. In comparison with the first group of feature points shown in FIGS. 3c and 3d, the second group of feature points shown in FIGS. 3f and 3g are within the distant touch line of the football pitch.

Figure 3H:
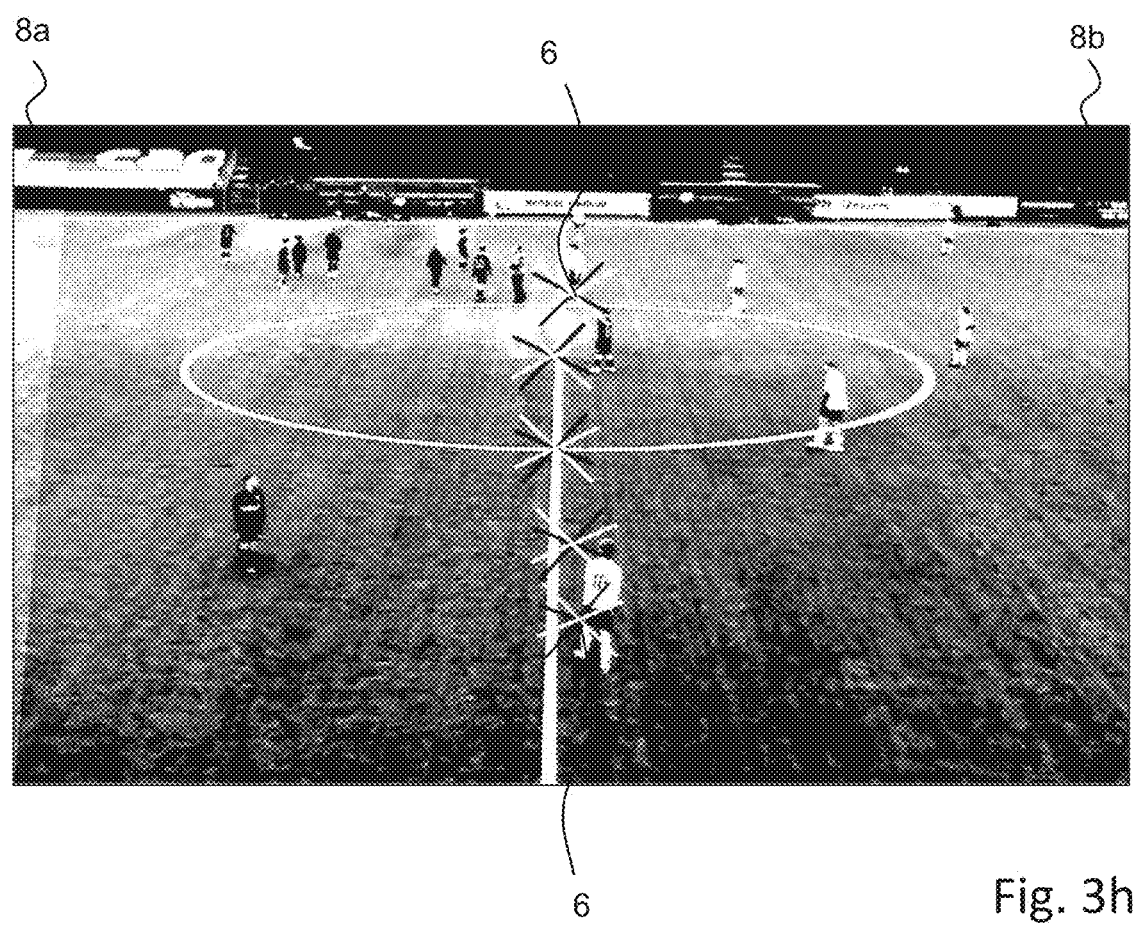

In FIG. 3h, the frames of the first and second video recordings 8a, 8b have been aligned to provide a final panoramic video. This alignment is based on determining a camera positioning estimate, i.e., an estimate of how the first and the second camera are positioned relative to each other, in particular how far apart they are spaced. With this information, the first and second video recordings can be stitched in a manner which reduces artefacts, such as parallax errors, in the panoramic video, especially in parts of the sport area which are located relatively close to the cameras.

In the method described in relation to FIGS. 3a-3h, feature points were divided into two distinct groups which served to provide a camera angle estimate and a camera positioning estimate, respectively. In other examples of the disclosure, a camera angle estimate and a camera positioning estimate may be provided based, at least partially, on a common group of feature points, instead of based solely on distinct groups of feature points.

Figure 4:
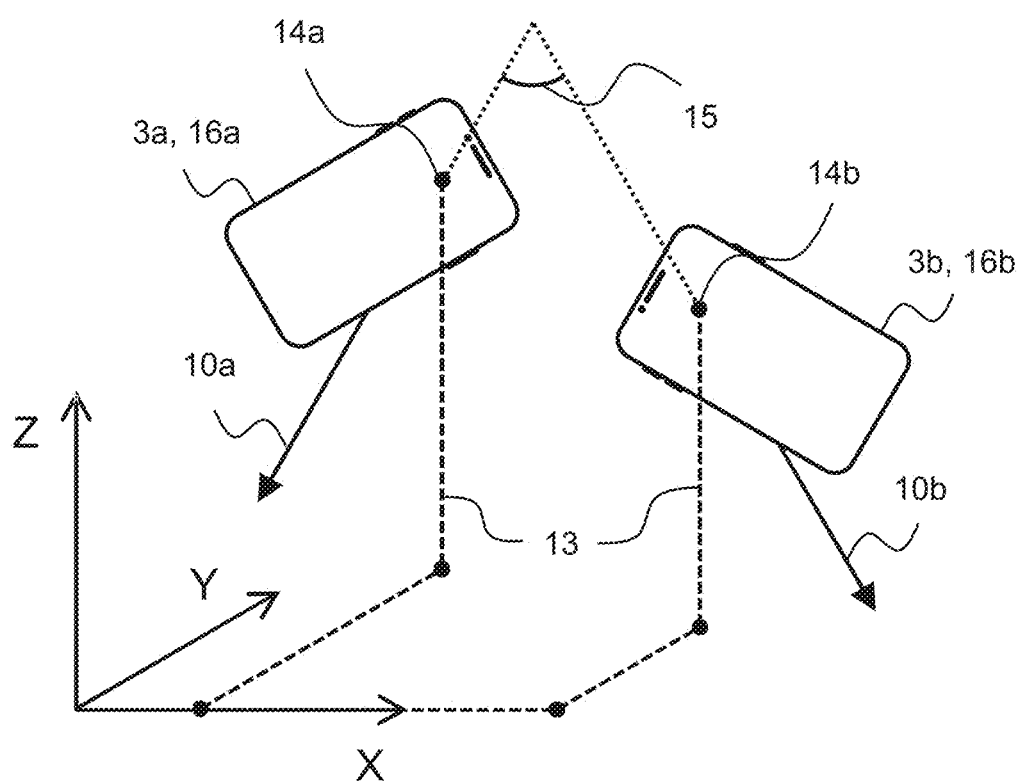
FIG. 4 illustrates an example of relative camera positioning and camera angle.

FIG. 4 illustrates an example of relative camera positioning 13 and camera angle 15.

Two mobile user devices 3a, 3b are illustrated in the figure, each comprising a respective video camera 16a, 16b. The video cameras 8a, 8b have a fixed relative camera positioning 13 and a fixed camera angle 15 relative to each other. The fixed positioning and angle may for example be provided by one or more mounts (not shown) configured to releasably fixate the mobile user devices 3a, 3b hosting the cameras 16a, 16b at approximate positions and angles relative to each other.

The first video camera 16a has a first recording angle 10b, i.e., the direction in which the video camera 16a is oriented, and the second video camera 16b has a second recording angle 10b. The first recording angle 10a and the second recording angle 10b provide the fixed camera angle 15 of the video cameras 16a, 16b relative to each other.

The first video camera 16a further has a first camera position 14a, and the second video camera 16b has a second camera position 14b. The first and second camera positions 14a, 14b together provide a relative camera positioning 13, for example, how far apart are the video cameras in three respective axes of a Cartesian coordinate system, i.e., relative spacing in the x-direction, y-direction, and z-direction. The position of the origin of the Cartesian coordinate system as well as the orientation of the coordinate system can be freely chosen. As an example, a video camera, or the mobile user device hosting a video camera, can be used to define the origin and orientation of the coordinate system, for example such that the origin is positioned at the camera position 14a of the first camera 16a of the first mobile user device 3a, and such that the coordinate system is oriented with the z-axis overlapping with the recording angle, the y-axis oriented along the longitudinal extend of the mobile user device 3a, and the x-axis oriented perpendicularly to the y-axis and the z-axis.

Although the relative camera positioning 13 has been described in association with three cartesian axes, examples of the present disclosure do not necessarily rely on a spacing along three axes to provide a panoramic video. For example, in some examples, a relative camera positioning is calculated simply as a scalar, for example, calculated to be, e.g., 40 cm.

LIST OF NUMBERED EMBODIMENTS

1. A computer-implemented method for stitching video recordings of a sport event, the method comprising the steps of:
   providing video recordings of a sport event at a sport area, the video recordings comprising a first video recording from a first video camera and a second video recording from a second video camera, wherein the video recordings are recorded while the first video camera and the second video camera have a fixed relative camera positioning and a fixed camera angle relative to each other and relative to the sport area;
   determining a first plurality of feature points in the first video recording and a second plurality of feature points in the second video recording, wherein the first plurality of feature points and the second plurality of feature points have a common set of feature points corresponding to feature points present in both the first video recording and the second video recording;
   identifying an element portion of a physical element present in at least one of the video recordings, wherein the element portion is associated with a physical size;
   estimating a feature location of one or more feature points of the common set, wherein the feature location is a representation of a physical location at the sport area relative to the first video camera and/or the second video camera, wherein the feature location is estimated based on an in-frame position of the element portion in one or more frames of the video recordings and on the physical size of the element portion; and
   stitching the first video recording and the second video recording based on the feature location to obtain a panoramic video of the sport event.

2. A method according to embodiment 1, wherein the first video camera is a camera of a first mobile user device and the second video camera is a camera of a second mobile user device.

3. A method according to any of the preceding embodiments, wherein the first video camera and the second video camera are different.

4. A method according to any of the preceding embodiments, wherein the method comprises a step of fixating the first video camera and the second video camera relative to each other, wherein the step of fixating the first video camera and the second video camera comprises releasably attaching each of the first video camera and the second video camera onto one or more camera mounts, wherein the step of fixating the first video camera and the second video camera is performed prior to the step of providing the video recordings.

5. A method according to embodiment 4, wherein the step of fixating the first video camera and the second video camera provides the fixed relative camera positioning and the fixed camera angle, wherein the one or more camera mounts releasably attaches the first video camera and the second video camera such that the fixed relative camera positioning is unknown and/or such that the fixed camera angle is unknown.

6. A method according to any of embodiments 4-5, wherein the method comprises a step of releasing the first video camera and the second video camera from the one or more camera mounts subsequent to recording the video recordings.

7. A method according to any of the preceding embodiments, wherein the physical element has a fixed location relative to the sport area.

8. A method according to any of the preceding embodiments, wherein the feature location is estimated based on a relative element location of the physical element relative to the sport area.

9. A method according to preceding embodiment 8, wherein the relative element location is provided based on an assumed location of the physical element relative to the sport area.

10. A method according to any of the preceding embodiments, wherein the method comprises a step of determining a camera positioning estimate indicative of the fixed relative camera positioning, wherein the camera positioning estimate is estimated based on a comparison of the one or more feature points of the common set in the first video recording with the one or more feature points of the common set in the second video recording,
   wherein the step of stitching the first video recording and the second video recording is based on the camera spacing estimate.

11. A method according to any of the preceding embodiments, wherein the method comprises a step of mapping at least one of the video recordings to a digital area model of the sport area such that the digital area model represents the sport area, wherein the mapping of the at least one of the video recordings to the digital area model provides a mapping of the feature location of the one or more feature points of the common set to the digital area model,
wherein the step of stitching the first video recording and the second video recording is based on the mapping of the feature location to the digital area model.

12. A method according to embodiment 11, wherein the step of stitching the first video recording and the second video recording is based on a comparison of the mapping of the feature location of feature points of the first video recording and the mapping of the feature location of feature points of the second video recording.

13. A method according to embodiment 12, wherein the comparison of the mapping of the feature location involves determining a distance between the mapping of the feature location of feature points of the first video recording and the mapping of the feature location of feature points of the second video recording.

14. A method according to embodiment 13, wherein the step of stitching the first video recording and the second video recording is based on reducing the distance between the mapping of the feature location of feature points of the first video recording and the mapping of the feature location of feature points of the second video recording to thereby determine the camera positioning estimate.

15. A method according to any of embodiments 11-14, wherein the step of mapping at least one of the video recordings to the digital area model is based on the step of identifying the element portion.

16. A method according to any of embodiments 11-15, wherein the step of mapping at least one of the video recordings to the digital area model is based on the relative element location and/or the physical size of the element portion.

17. A method according to any of the preceding embodiments, wherein a physical camera location of the first video camera and/or the second video camera relative to the sport area is determined based on the step of identifying the element portion, wherein the step of stitching the first video recording and the second video recording is based on the camera location.

18. A method according to embodiment 17, wherein the camera location is determined based on the mapping of the at least one of the video recordings to the digital area model.

19. A method according to any of the preceding embodiments, wherein the step of stitching comprises matching the one or more feature points of the common set in the first video recording with the one or more feature points of the common set in the second video recording to thereby provide an alignment of the first video recording and the second video recording.

20. A method according to any of the preceding embodiments, wherein the method comprises a step of determining a relative scaling factor indicative of relative scaling between the first video recording and the second video recording, wherein the step of stitching the first video recording and the second video recording is based on the relative scaling factor.

21. A method according to any of the preceding embodiments, wherein the step of stitching the first video recording and the second video recording is based on one or more intrinsic camera parameters and/or distortion parameters of the first video camera and/or the second video camera.

22. A method according to any of the preceding embodiments, wherein the step of stitching the first video recording and the second video recording is based on a camera angle estimate, wherein the camera angle estimate is indicative of the fixed camera angle.

23. A method according to embodiment 22, wherein the method comprises a step of determining the camera angle estimate, wherein the camera angle estimate is determined based on a comparison of the one or more feature points of the common set in the first video recording with the one or more feature points of the common set in the second video recording.

24. A method according to embodiment 23, wherein the camera angle estimate is determined based on a comparison of the mapping of the feature location of feature points of the first video recording and the mapping of the feature location of feature points of the second video recording.

25. A method according to any of the preceding embodiments, wherein the one or more feature points of the common set comprises at least a first feature point and a second feature point, wherein the feature location of the first feature point and the feature location of the second feature point are located at different distances relative to the first camera and/or the second camera.

26. A method according to any of the preceding embodiments, wherein the one or more feature points are weighted based on a distance of the feature location relative to the first camera and/or the second camera such that one feature point having a greater distance than another feature point has a greater relative weight when determining the camera angle estimate and/or a lesser relative weight when determining the camera positioning estimate.

27. A method according to any of the preceding embodiments, wherein a common sub-area of the first video recording and the second video recording has a digital center reference line located centrally in the common sub-area and oriented with a direction away from the first video camera and the second video camera, wherein the one or more feature points are weighted based on a distance of the feature location relative to the center reference line such that one feature point having a greater distance than another feature point has a lesser relative weight when stitching the first video recording and the second video recording.

28. A method according to any of the preceding embodiments, wherein the physical element is a sport-related element, for example a physical goal or the sport area.

29. A method according to any of the preceding embodiments, wherein the step of providing video recordings comprises the sub-steps of:
fixating a first mobile user device and a second mobile user device relative to each other and relative to the sport area, wherein the first mobile user device comprises the first video camera and is configured to initiate recording of the first video recording upon receiving an incoming initiation signal, wherein the second mobile user device comprises the second video camera and is configured to initiate recording of the second video recording upon receiving an incoming initiation signal;
providing a third mobile user device configured to transmit the initiation signal; and
transmitting the initiation signal from the third mobile user device to the first mobile user device and to the second mobile user device to thereby initiate recording of the first video recording and of the second video recording.

30. A method according to embodiment 29, wherein the initiation signal is transmitted to the first mobile user device and the second mobile user device simultaneously to thereby initiate recording of the first video recording and of the second video recording simultaneously, the step of stitching the first video recording and the second video recording is performed based on the first video recording and the second video recording being initiated simultaneously.

31. A computer program for stitching video recordings of a sport event, the computer program comprising digital instructions which, when the computer program is executed by a computer processing system, cause the computer processing system to:
- receive video recordings of a sport event at a sport area, the video recordings comprising a first video recording from a first video camera and a second video recording from a second video camera, wherein the video recordings are recorded while the first video camera and the second video camera have a fixed relative camera positioning and a fixed camera angle relative to each other and relative to the sport area;
- determine a first plurality of feature points in the first video recording and a second plurality of feature points in the second video recording, wherein the first plurality of feature points and the second plurality of feature points have a common set of feature points corresponding to feature points present in both the first video recording and the second video recording;
- identify an element portion of a physical element present in at least one of the video recordings, wherein the element portion is associated with a physical size;
- estimate a feature location of one or more feature points of the common set, wherein the feature location is a representation of a physical location at the sport area relative to the first video camera and/or the second video camera, wherein the feature location is estimated based on an in-frame position of the element portion in one or more frames of the video recordings and on the physical size of the element portion; and
- stich the first video recording and the second video recording based on the feature location to obtain a panoramic video of the sport event.

32. A method according to embodiment 31, wherein the digital instructions, when the software application is executed by the computer processing system, cause the computer processing system to perform the method according to any of embodiments 1-30.

33. A system for recording a sport event, the system comprising:
- a sport area for hosting the sport event;
- a first video camera located at the sport area for recording the sport event to provide a first video recording;
- a second video camera located at the sport area for recording the sport event to provide a second video recording, wherein the first video camera and the second video camera have a fixed relative camera positioning and a fixed camera angle relative to each other and relative to the sport area;
- a computer processing system communicatively linked to the first video camera and the second video camera, wherein the computer processing system is configured to:
- receive video recordings of the sport event at the sport area, the video recordings comprising the first video recording from the first video camera and the second video recording from the second video camera;
- determine a first plurality of feature points in the first video recording and a second plurality of feature points in the second video recording, wherein the first plurality of feature points and the second plurality of feature points have a common set of feature points corresponding to feature points present in both the first video recording and the second video recording;
- identify an element portion of a physical element present in at least one of the video recordings, wherein the element portion is associated with a physical size;
- estimate a feature location of one or more feature points of the common set, wherein the feature location is a representation of a physical location at the sport area relative to the first video camera and/or the second video camera, wherein the feature location is estimated based on an in-frame position of the element portion in one or more frames of the video recordings and on the physical size of the element portion; and
- stich the first video recording and the second video recording based on the feature point distance to obtain a panoramic video of the sport event.

34. A system according to embodiment 33, wherein the computer processing system is configured to perform the method according to any of embodiments 1-30.

The invention claimed is:

1. A computer-implemented method for stitching video recordings of a sport event, the method comprising the steps of:
- providing video recordings of a sport event at a sport area, the video recordings comprising a first video recording from a first video camera and a second video recording from a second video camera, wherein the video recordings are recorded while the first video camera and the second video camera have a fixed relative camera positioning and a fixed camera angle relative to each other and relative to the sport area;
- determining a first plurality of feature points in the first video recording and a second plurality of feature points in the second video recording, wherein the first plurality of feature points and the second plurality of feature points have a common set of feature points corresponding to feature points present in both the first video recording and the second video recording;
- identifying an element portion of a physical element present in at least one of the video recordings, wherein the element portion is associated with a physical size;
- estimating a feature location of one or more feature points of the common set, wherein the feature location is a representation of a physical location at the sport area relative to any of the first video camera and the second video camera, wherein the feature location is estimated based on an in-frame position of the element portion in one or more frames of the video recordings and on the physical size of the element portion; and
- stitching the first video recording and the second video recording based on the feature location to obtain a panoramic video of the sport event.

2. A method according to claim 1, wherein the first video camera is a camera of a first mobile user device and the second video camera is a camera of a second mobile user device.

3. A method according to claim 1, wherein the method comprises a step of fixating the first video camera and the second video camera relative to each other, wherein the step of fixating the first video camera and the second video camera comprises releasably attaching each of the first video camera and the second video camera onto one or more camera mounts, wherein the step of fixating the first video camera and the second video camera is performed prior to the step of providing the video recordings.

4. A method according to claim 3, wherein the step of fixating the first video camera and the second video camera provides the fixed relative camera positioning and the fixed camera angle, wherein the one or more camera mounts releasably attaches the first video camera and the second video camera such that any of the fixed relative camera positioning and the fixed camera angle is unknown.

5. A method according to claim 1, wherein the physical element has a fixed location relative to the sport area.

6. A method according to claim 1, wherein the feature location is estimated based on a relative element location of the physical element relative to the sport area.

7. A method according to claim 1, wherein the method comprises a step of determining a camera positioning estimate indicative of the fixed relative camera positioning, wherein the camera positioning estimate is estimated based on a comparison of the one or more feature points of the common set in the first video recording with the one or more feature points of the common set in the second video recording,
wherein the step of stitching the first video recording and the second video recording is based on the camera spacing estimate.

8. A method according to claim 1, wherein the method comprises a step of mapping at least one of the video recordings to a digital area model of the sport area such that the digital area model represents the sport area,
wherein the mapping of the at least one of the video recordings to the digital area model provides a mapping of the feature location of the one or more feature points of the common set to the digital area model,
wherein the step of stitching the first video recording is based on the mapping of the feature location to the digital area model.

9. A method according to claim 8, wherein the step of stitching the first video recording and the second video recording is based on a comparison of the mapping of the feature location of feature points of the first video recording and the mapping of the feature location of feature points of the second video recording.

10. A method according to claim 9, wherein the step of mapping at least one of the video recordings to the digital area model is based on any of the relative element location and the physical size of the element portion.

11. A method according to claim 1, wherein a physical camera location of any of the first video camera and the second video camera relative to the sport area is determined based on the step of identifying the element portion, wherein the step of stitching the first video recording and the second video recording is based on the camera location.

12. A method according to claim 11, wherein the camera location is determined based on the mapping of the at least one of the video recordings to the digital area model.

13. A method according to claim 1, wherein the step of stitching comprises matching the one or more feature points of the common set in the first video recording with the one or more feature points of the common set in the second video recording to thereby provide an alignment of the first video recording and the second video recording.

14. A method according to claim 1, wherein the one or more feature points of the common set comprises at least a first feature point and a second feature point, wherein the feature location of the first feature point and the feature location of the second feature point are located at different distances relative to any of the first camera and the second camera.

15. A method according to claim 7, wherein the one or more feature points are weighted based on a distance of the feature location relative to any of the first camera and the second camera such that one feature point having a greater distance than another feature point has a lesser relative weight when determining the camera positioning estimate.

16. A method according to claim 1, wherein the physical element is a sport-related element, for example a physical goal or the sport area.

17. A method according to claim 1, wherein the step of providing video recordings comprises the sub-steps of:
fixating a first mobile user device and a second mobile user device relative to each other and relative to the sport area, wherein the first mobile user device comprises the first video camera and is configured to initiate recording of the first video recording upon receiving an incoming initiation signal, wherein the second mobile user device comprises the second video camera and is configured to initiate recording of the second video recording upon receiving an incoming initiation signal;
providing a third mobile user device configured to transmit the initiation signal; and
transmitting the initiation signal from the third mobile user device to the first mobile user device and to the second mobile user device to thereby initiate recording of the first video recording and of the second video recording.

18. A method according to claim 17, wherein the initiation signal is transmitted to the first mobile user device and the second mobile user device simultaneously to thereby initiate recording of the first video recording and of the second video recording simultaneously, the step of stitching the first video recording and the second video recording is performed based on the first video recording and the second video recording being initiated simultaneously.

19. A computer program stored in a non-transitory computer readable medium for stitching video recordings of a sport event, the computer program comprising digital instructions which, when the computer program is executed by a computer processing system, cause the computer processing system to:
receive video recordings of a sport event at a sport area, the video recordings comprising a first video recording from a first video camera and a second video recording from a second video camera, wherein the video recordings are recorded while the first video camera and the second video camera have a fixed relative camera positioning and a fixed camera angle relative to each other and relative to the sport area;
determine a first plurality of feature points in the first video recording and a second plurality of feature points in the second video recording, wherein the first plurality of feature points and the second plurality of feature points have a common set of feature points corresponding to feature points present in both the first video recording and the second video recording;
identify an element portion of a physical element present in at least one of the video recordings, wherein the element portion is associated with a physical size;
estimate a feature location of one or more feature points of the common set, wherein the feature location is a representation of a physical location at the sport area relative to any of the first video camera and the second video camera, wherein the feature location is estimated based on an in-frame position of the element portion in one or more frames of the video recordings and on the physical size of the element portion; and
stich the first video recording and the second video recording based on the feature location to obtain a panoramic video of the sport event.

20. A system for recording a sport event, the system comprising:
a sport area for hosting the sport event;
a first video camera located at the sport area for recording the sport event to provide a first video recording;
a second video camera located at the sport area for recording the sport event to provide a second video recording, wherein the first video camera and the second video camera have a fixed relative camera positioning and a fixed camera angle relative to each other and relative to the sport area;
a computer processing system communicatively linked to the first video camera and the second video camera,
wherein the computer processing system is configured to:
receive video recordings of the sport event at the sport area, the video recordings comprising the first video recording from the first video camera and the second video recording from the second video camera;
determine a first plurality of feature points in the first video recording and a second plurality of feature points in the second video recording, wherein the first plurality of feature points and the second plurality of feature points have a common set of feature points corresponding to feature points present in both the first video recording and the second video recording;
identify an element portion of a physical element present in at least one of the video recordings, wherein the element portion is associated with a physical size;
estimate a feature location of one or more feature points of the common set, wherein the feature location is a representation of a physical location at the sport area relative to any of the first video camera and the second video camera, wherein the feature location is estimated based on an in-frame position of the element portion in one or more frames of the video recordings and on the physical size of the element portion; and
stich the first video recording and the second video recording based on the feature point distance to obtain a panoramic video of the sport event.

* * * * *